United States Patent
Clodic et al.

(10) Patent No.: US 9,468,881 B2
(45) Date of Patent: Oct. 18, 2016

(54) COOLING SYSTEM OF A PSYCHROMETRIC MIXTURE BY COUPLING A CONDENSATION UNIT AND AN EVAPORATION UNIT

(75) Inventors: Denis Clodic, Paris (FR); Mourad Younes, Paris (FR); Elias Bou Lawz Ksayer, Paris (FR)

(73) Assignee: ASSOCIATION POUR LA RECHERCHE ET LE DEVELOPPEMENT DES METHODES ET PROCESSUS INDUSTRIELS "ARMINES", Paris (FR)

( * ) Notice: Subject to any disclaimer, the term of this patent is extended or adjusted under 35 U.S.C. 154(b) by 1216 days.

(21) Appl. No.: 12/810,546
(22) PCT Filed: Dec. 24, 2008
(86) PCT No.: PCT/FR2008/052418
§ 371 (c)(1),
(2), (4) Date: Aug. 3, 2010
(87) PCT Pub. No.: WO2009/083696
PCT Pub. Date: Jul. 9, 2009

(65) Prior Publication Data
US 2010/0293995 A1 Nov. 25, 2010

(30) Foreign Application Priority Data
Dec. 27, 2007 (FR) ...................................... 07 60386

(51) Int. Cl.
*F28D 5/00* (2006.01)
*B01D 53/00* (2006.01)
*B01D 53/26* (2006.01)

(52) U.S. Cl.
CPC ........... *B01D 53/002* (2013.01); *B01D 53/265* (2013.01)

(58) Field of Classification Search
CPC ....... Y02B 30/545; F24F 5/0035; F25D 5/00
USPC .......... 62/50.1, 606, 506, 121, 304; 261/36.1
See application file for complete search history.

(56) References Cited

U.S. PATENT DOCUMENTS

| | | | | |
|---|---|---|---|---|
| 4,984,434 | A * | 1/1991 | Peterson et al. | .................. 62/94 |
| 5,048,200 | A | 9/1991 | Ryham | |
| 2008/0018001 | A1 * | 1/2008 | Kammerzell et al. | .......... 261/97 |

FOREIGN PATENT DOCUMENTS

| | | |
|---|---|---|
| DE | 3147460 | 6/1983 |
| EP | 0485375 | 5/1992 |

(Continued)

OTHER PUBLICATIONS

International Search Report for PCT/FR2008/052418 dated Jun. 18, 2009.

(Continued)

*Primary Examiner* — Melvin Jones
(74) *Attorney, Agent, or Firm* — Cozen O'Connor (57) ABSTRACT

A cooling system of a first psychrometric mixture having a condensation unit capable of condensing fluid contained in this mixture by direct contact with liquid comprising this fluid, the liquid being in the condensation unit at a temperature below that of the first mixture, and an evaporation unit capable of evaporating liquid in a second psychrometric mixture having fluid, the liquid being in the evaporation unit at a temperature greater than that of the second mixture, the condensation and evaporation units being coupled by a circulation circuit of the liquid, and a regulator for regulating the liquid flow.

17 Claims, 6 Drawing Sheets

(56) References Cited

FOREIGN PATENT DOCUMENTS

| | | |
|---|---|---|
| EP | 0796134 | 7/2002 |
| FR | 601554 | 3/1926 |
| WO | WO 2007/009488 A1 | 1/2007 |

OTHER PUBLICATIONS

International Preliminary Examination Report and Written Opinion dated Jun. 18, 2009.
French Search Report dated Jul. 7, 2008.

* cited by examiner

COOLING SYSTEM OF A PSYCHROMETRIC MIXTURE BY COUPLING A CONDENSATION UNIT AND AN EVAPORATION UNIT

PRIORITY CLAIM

This is a U.S. national stage of application No. PCT/FR2008/052418, filed on Dec. 24, 2008. Priority is claimed on the following application: France Application No.: 0760386, Filed on Dec. 27, 2007, the content of which is incorporated here by reference.

BACKGROUND OF THE INVENTION

The invention relates to the general field of cooling of psychrometric mixtures.

It is understood that a psychrometric mixture contains two types of gas, specifically:
- a first type of gas which, under temperature and pressure conditions cannot go to the liquid state; and
- a second type of gas under conditions where it can either condense or evaporate.

By way of example, humid air is an example of a psychrometric mixture, comprising:
- dry air not condensing under normal temperature and pressure conditions; and
- water vapour capable of either condensing or evaporating as a function of temperature and pressure conditions.

Fumes from combustion units, (or more generally any gaseous effluent comprising gases of air in variable concentrations and compounds such as $CO_2$ and $H_2O$) are other examples of psychrometric mixtures. In general, combustion fumes are psychrometric mixtures having a substantial concentration in water vapour.

Other less common psychrometric mixtures are known, especially mixtures of helium and ammonia and mixtures of hydrogen and ammonia.

The document FR 2 820 052 describes an extraction process of carbon dioxide contained in fumes, in which the fumes are cooled at a pressure substantially equal to atmospheric pressure and at such a temperature that carbon dioxide moves directly from the vaporous state to the solid state by a process of anti-sublimation, water also being extracted in liquid form by an air exchanger, for example.

This type of system, though particularly advantageous, does not unfortunately recover the coolness of the cooled gases over a wide temperature range. Nor does it carry out boosted dehumidification of dry fumes, at low cost.

SUBJECT MATTER AND SUMMARY OF THE INVENTION

In accordance with a first aspect, the invention relates to a cooling system of a first psychrometric mixture. This system comprises:
- a condensation unit comprising a circulation circuit of the first psychrometric mixture, this condensation unit being capable of condensing fluid contained in this mixture by direct contact with liquid comprising this fluid, the liquid being in the condensation unit at a temperature below that of the dew point of this first mixture;
- a main evaporation unit comprising a circulation circuit of a second psychrometric mixture comprising the above cited fluid, this main evaporation unit being capable of evaporating liquid in the second psychrometric mixture, this liquid being in the evaporation unit at a temperature greater than that of the dew point of the second mixture, the main condensation and evaporation units being coupled by a circulation circuit of the liquid; and
- regulating means of at least one flow of said liquid in the system.

In a highly advantageous manner, coupling the condensation unit and the main evaporation unit allows to recover the coolness of the first psychrometric mixture over a wide temperature range.

This system also dehumidifies the first psychrometric mixture in a highly boosted manner. For example, when the first psychrometric mixture is fumes, dehumidification to $1.10^{-6}$ g $H_2O$/kg can be attained at low cost and with high energy efficiency.

In the system according to the invention, fluid can move from the gaseous state to the liquid state in the condensation unit, and from the liquid state to the gaseous state in the main evaporation unit, when temperature and pressure conditions of the psychrometric mixtures are combined.

The psychrometric mixture to be cooled circulating in the condensation unit is saturating or close to saturation.

In accordance with a second aspect, the invention also relates to a condensation unit which can be used in a cooling system according to the invention.

This condensation unit comprises a circulation circuit of a psychrometric mixture containing condensable fluid, a circulation circuit of liquid comprising this fluid, the temperature of the liquid being below that of the dew point of the mixture, means of direct contact of the psychrometric mixture and of the liquid and means capable of measuring a temperature range between the temperature of the liquid entering this unit and the temperature of the psychrometric mixture leaving this unit.

It is important to note that the condensation unit according to the invention is fundamentally different to cooling towers known in the field of heat transfer technologies.

In fact, in general in such cooling towers water for cooling is pulverised by distribution ramps on a lining, and put in direct contact with an air flow set in motion by a fan or by a current of air, this air flow becoming charged with humidity and drawing droplets of water towards a compartment arranged in the lower part of the tower.

Otherwise expressed, the functioning of these towers is based on cooling of water by evaporation in air relatively far from these conditions of saturation.

The objective and operation of the condensation unit according to the invention is therefore fundamentally different, since its purpose is to condense water vapour (or more generally condensable fluid) contained in the psychrometric mixture under conditions close to saturation by direct contact with colder liquid.

More precisely, the temperature of the liquid is lower than the dew point of the psychrometric mixture.

In keeping with the invention, the liquid circulating in the condensation unit comprises at least one compound identical to the condensable fluid of the psychrometric mixture.

In a particular embodiment, the means of direct contact of the condensation unit according to the invention comprise a lining for augmenting the surface of direct contact between the liquid and the psychrometric mixture.

In a particular embodiment, the circulation circuits of liquid and circulation of the psychrometric mixture of the condensation unit according to the invention are arranged so that the psychrometric mixture and the liquid circulate counter-current.

The liquid drawn by gravity preferably circulates from top to bottom, and the psychrometric mixture from bottom to top.

The overall evolution in the condensation unit according to the invention is the following: liquid entering at an initial temperature, clearly lower than the input temperature of the psychrometric mixture, typically from 5 to 50 K, is reheated progressively by direct contact with the psychrometric mixture.

Inversely, the psychrometric mixture is cooled.

Throughout this cooling, the fluid, close to its saturation conditions and contained in the psychrometric mixture condenses, effectively increasing the solid flow of the liquid.

It eventuates from these transfers of mass and heat both that the psychrometric mixture leaves the condensation unit at a temperature below its intake temperature and with a composition of condensable fluid less than the intake composition, and on the other hand, that the temperature of the liquid discharging from the condensation unit is greater than its intake temperature, the exiting mass flow being greater than the incoming flow, the liquid flow being increased by the mass flow of the condensed fluid.

In keeping with the invention, the psychrometric mixture passing through the main evaporation unit contains the above cited condensable fluid, but in a concentration far from saturation conditions.

In the main evaporation unit, the liquid is at a temperature greater than that of the psychrometric mixture.

As a consequence, the liquid partially evaporates and is cooled in the main evaporation unit. The liquid flow leaving this main evaporation unit is therefore less than the incoming flow.

For its part, the psychrometric mixture is reheated by passing through the main evaporation unit and its concentration of condensable fluid increases.

In a particular embodiment, the system according to the invention comprises regulating means of the flow of the first psychrometric mixture and/or of the flow of the second psychrometric mixture.

This characteristic beneficially regulates the flow of a mixture relative to the flow of the other mixture, and therefore overall balances mass and heat transfers in the system.

The regulating means of the system according to the invention can for example comprise four thermal probes placed:
  at the intakes of the liquid in the condensation unit and in the main evaporation unit; and
  at the discharges of the psychrometric mixtures of these units.

In the system according to the invention, it is preferable for the spread between the temperature of the liquid entering a unit and the temperature of the psychrometric mixture leaving this unit is of the order of 1 to 2° C.

In the majority of applications, the flows of the psychrometric mixtures circulating in the condensation unit and the main evaporation unit are fixed by operating conditions external to its units.

It is therefore preferable to regulate flows of liquids entering these units.

Throughout this document:
  "condensation pinching" will designate the difference between the temperature of the dehumidified psychrometric mixture leaving the condensation unit and the temperature of the colder liquid entering this unit; and
  "evaporation pinching" will designate the range between the temperature of the humidified psychrometric mixture leaving the evaporation unit and the temperature of the warmer liquid entering this unit.

The values of these two pinches can be read for example by the regulating means of the system according to the invention at regular intervals, typically every 30 seconds.

In a particular embodiment of the invention, the regulating means comprise:
  means for measuring a temperature range between the temperature of the liquid entering at least one of the main condensation or evaporation units and the temperature of the psychrometric mixture discharging from this unit; and
  means for regulating the liquid flow entering this unit as a function of this temperature range.

The regulating means of the system according to the invention preferably measure both the condensation pinching and the evaporation pinching and regulate the liquid flow entering each of the main condensation and evaporation units as a function of these two pinches.

In a particular embodiment of the invention, the regulating means regulate the liquid flow entering a unit by means of a pump capable of injecting liquid into this unit from a storage tank.

This storage tank can comprise a compartment arranged in the lower part of the other unit.

The system according to the invention optionally comprises means for cooling the liquid discharging from the main evaporation unit (in other words, the liquid input into the condensation unit). The already cooled liquid in the main evaporation unit is thus cooled a second time. An exchanger places on the circulation circuit downstream of the main evaporation unit can be used for this purpose.

In this particular embodiment, the regulating means according to the invention are preferably capable of:
  increasing the liquid flow entering the main evaporation unit;
  increasing the liquid flow entering the condensation unit;
  measuring the condensation pinching; and when this pinching is over a threshold:
  acting on the cooling means of the liquid to increase its cooling power.

The system according to the invention optionally comprises an overflow for discharging part of the liquid condensed in the condensation unit. This characteristic allows to recover part of the liquid condensing in the condensation unit when the latter is greater than the quantity of liquid which evaporates in the main evaporation unit.

In this particular embodiment of the invention, the regulating means of the system are preferably capable of:
  measuring the condensation pinching; and when this pinching is over a threshold;
  increasing the flows of liquid entering the main condensation and evaporation units in similar proportions.

In a variant use of the invention, the liquid comprises a salt. In this case, it can be interesting to lower the concentration of water of the liquid solution discharging from the condensation unit.

Also, in this particular variant embodiment the system according to the invention comprises a secondary liquid evaporation unit, placed in series between the condensation unit and the first evaporation unit in the circulation circuit of the liquid.

This secondary evaporation unit operates at a temperature much greater than that of the main evaporation unit.

In a particular embodiment of this variant of the invention, the secondary evaporation unit comprises an air intake and an air discharge, the air being capable of circulating counter-current to the liquid in the secondary evaporation unit, and a fan of variable rate upstream of this air intake, the regulating means being capable of adjusting the air flow and the liquid flow entering the secondary evaporation unit as a function of a temperature range between the temperature of the liquid entering this unit and the temperature of the air leaving this unit.

In a particular embodiment of this variant, the system according to the invention comprises a heat exchanger capable of recovering the coolness of the liquid flowing from the condensation unit to the secondary evaporation unit.

In a particular embodiment of this variant, the system according to the invention comprises adjustment means of the concentration of salt in the liquid discharging from each of the main and secondary evaporation units.

In a specific use of the invention, especially for cooling fumes, the liquid enters the main evaporation unit at a temperature of around −40° C.

Yet, the evaporation units of the state of the art have never been used in such temperature ranges.

Consequently, and according to a third aspect, the invention relates to an evaporation unit comprising a circulation circuit of a psychrometric mixture containing evaporable fluid, a circulation circuit of a liquid comprising this fluid, the temperature of the liquid being of the order of −40° C. and greater than that of the dew point of the psychrometric mixture, direct contact means of the psychrometric mixture and of the liquid, and control means capable of measuring a temperature range between the temperature of the liquid entering the evaporation unit and the temperature of the psychrometric mixture discharging from this unit.

The invention also relates to the cooling process utilised by the system according to the invention.

Also, and according to a fourth aspect, the invention relates to a cooling process of a first psychrometric mixture, this process comprising in a closed loop:

a condensation step of fluid contained in the mixture by direct contact with liquid comprising this fluid, the liquid being at a temperature below that of the dew point of the first mixture, and an evaporation step of liquid condensed during the condensation step in a second psychrometric mixture comprising fluid, the liquid being at a temperature greater than that of the dew point of the second mixture, and a reinjection step of the liquid evaporated during the evaporation step for use in the condensation step.

BRIEF DESCRIPTION OF THE DIAGRAMS

Other characteristics and advantages of the present invention will emerge from the following description in reference to the attached diagrams which illustrate an exemplary embodiment devoid of any limiting character, in which.

DETAILED DESCRIPTION OF AN EMBODIMENT

In each of the figures, the fine arrows represent flows of psychrometric mixtures, and the thick arrows represent liquid flows.

Figure 1:
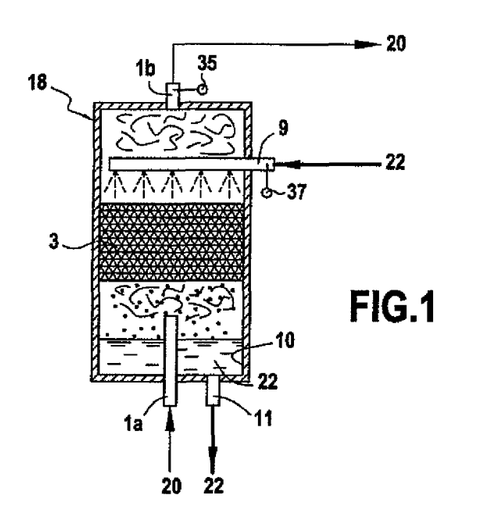
FIG. 1 illustrates a condensation unit according to the invention in a particular embodiment.

FIG. 1 illustrates a condensation unit 18 according to the invention, into which a psychrometric mixture 20 can be introduced.

In the embodiment of FIG. 1, the psychrometric mixture is introduced into the condensation unit 18 via piping 1a, this piping terminating in the lower part of the condensation unit 18.

In the embodiment of FIG. 1, the psychrometric mixture 20 is discharged from the condensation unit 18 via piping 1b terminating in an upper part of the condensation unit 18.

In keeping with the invention, the condensation unit 18 comprises an intake for liquid 22 capable of condensing fluid of the psychrometric mixture 20. The temperature of this liquid is below that of the dew point of the psychrometric mixture 20.

In the embodiment of FIG. 1, the condensation unit 18 comprises a probe 37 capable of measuring the temperature of the liquid 22 at the intake of this unit and a probe 35 capable of measuring the temperature of the psychrometric mixture 20 discharging from this unit.

The difference between the temperature measured by the probe 35 and the temperature measured by the probe 37 corresponds to the "condensation pinching".

In the embodiment described here, this liquid 22 enters the condensation unit 18 via a supply ramp 9 arranged in the upper part of the condensation unit 18, the liquid accumulating in a compartment 10 in the lower part of the condensation unit 18.

Otherwise expressed, the psychrometric mixture 20 and the liquid 22 circulate in the condensation unit 18 counter-current.

The introduction piping 1a of the psychrometric mixture 20 terminates above of the level of liquid in the compartment 10.

In keeping with the invention, the psychrometric mixture 20 and the liquid enter into direct contact in the condensation unit 18.

In the embodiment described here, this direct contact takes place at least partially on a lining 3 located overside from the liquid supply ramp 9.

In the embodiment described here, a discharge 11 for evacuating liquid 22 from the condensation unit 18 is provided in the base of the compartment 10.

Contacting of the psychrometric mixture 20 and of liquid 22 has a number of effects.

First, the psychrometric mixture 20 is cooled.

And, the condensable fluid contained in the psychrometric mixture 20 condenses, at least partially. The resulting effect is an increase in the liquid flow in the condensation unit 18, the flow measured at the level of the evacuation at the discharge 11 being greater than that measured at the level of the ramp 9.

Figure 2:
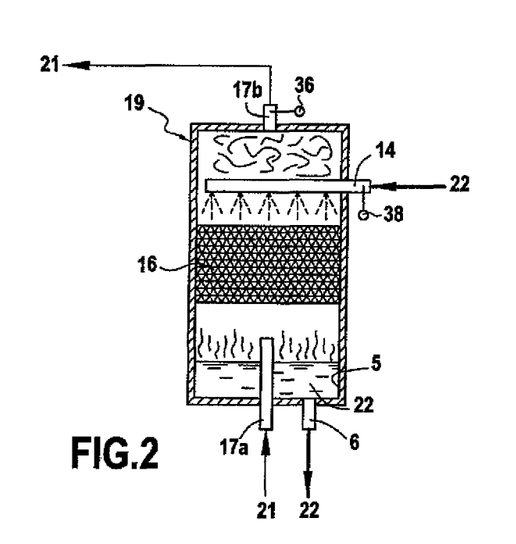
FIG. 2 illustrates an evaporation unit according to the invention in a particular embodiment.

FIG. 2 illustrates an evaporation unit 19 according to the invention into which a psychrometric mixture 21 can be introduced, this psychrometric mixture comprising an evaporable fluid at a concentration far from its saturation conditions.

In the embodiment of FIG. 2, the psychrometric mixture 21 is introduced to the evaporation unit 19 via piping 17a, this piping terminating in the lower part of the evaporation unit 19.

In the embodiment of FIG. 2, the psychrometric mixture 21 is evacuated from the evaporation unit 19 via piping 17b terminating in an upper part of the evaporation unit 19.

In keeping with the invention, the evaporation unit 19 comprises an intake for liquid 22 whereof the temperature is greater than that of the dew point of the psychrometric mixture 21.

In the embodiment of FIG. 2, the evaporation unit 19 comprises a probe 38 capable of measuring the temperature at intake of the evaporation unit and a probe 36 capable of measuring the temperature of the psychrometric mixture 21 discharging from this unit.

The difference between the temperature measured by the probe 38 and the temperature measured by the probe 36 corresponds to the "evaporation pinching".

In the embodiment described here, this liquid 22 enters the evaporation unit 19 via a distribution system 14, arranged in the upper part of the evaporation unit 19, the liquid accumulating in a compartment 5 in the lower part of the evaporation unit 19.

Otherwise expressed, the psychrometric mixture 21 and the liquid 22 circulate in the evaporation unit 19 countercurrent.

The piping 17a of the psychrometric mixture 21 terminates above the level of liquid in the compartment 5.

In keeping with the invention, the psychrometric mixture 21 and the liquid 22 enter into direct contact in the evaporation unit 19.

In the embodiment described here, this direct contact takes place, at least partially, on a lining 16 located overside from the distribution system 14 of liquid 22.

In the embodiment described here, a discharge 6 for evacuating the liquid 22 from the evaporation unit 19 is provided in the base of the compartment 5.

Contacting of the psychrometric mixture 21 and of the liquid 22 has a number of effects.

First, the liquid 22 is cooled.

And, the liquid 22 evaporates on contact with the psychrometric mixture 21, the concentration of this mixture in evaporable fluid being far from its saturation conditions.

Figure 3:
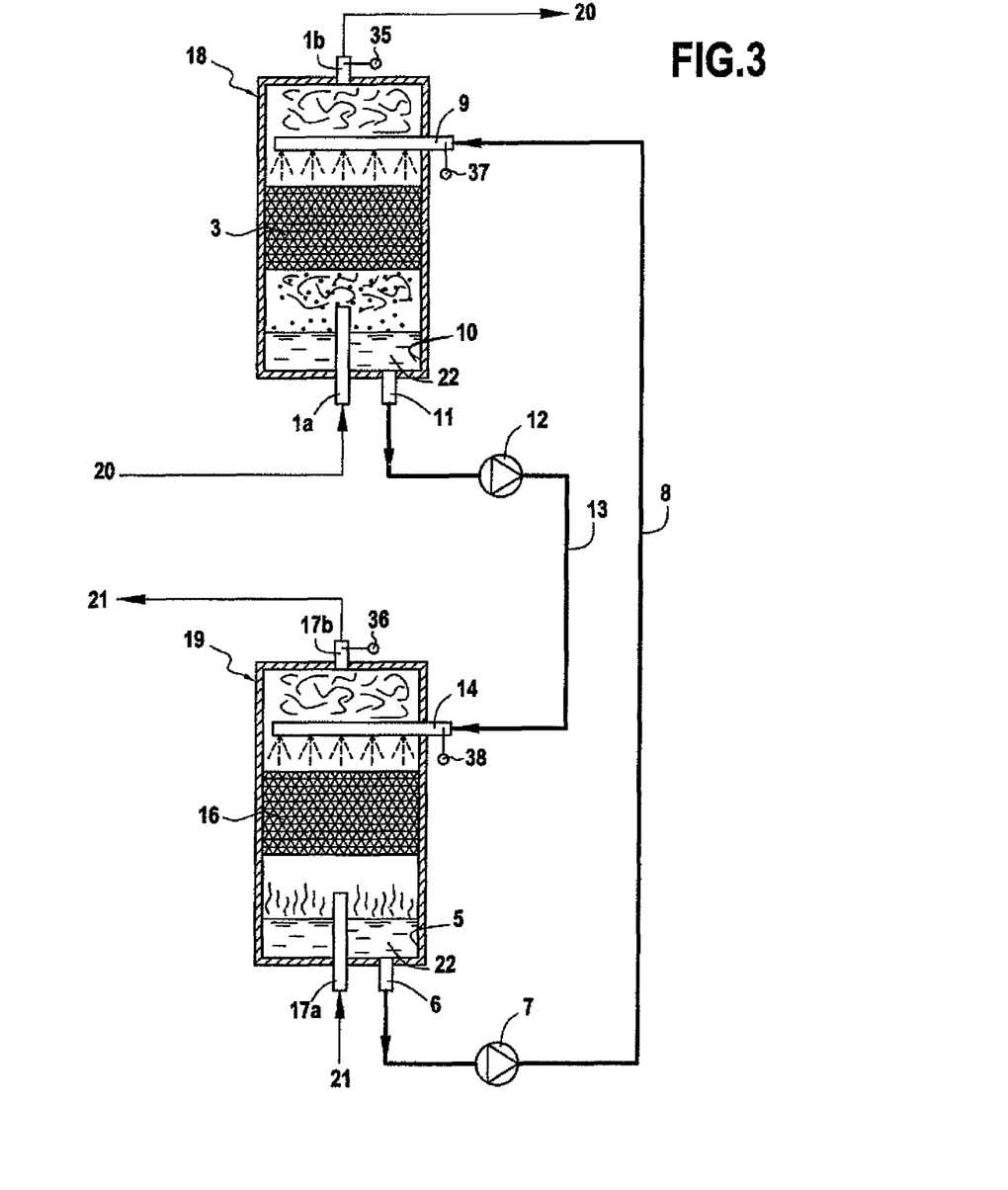
FIG. 3 illustrates a cooling system of a psychrometric mixture according to the invention in a particular embodiment.

FIG. 3 illustrates a cooling system according to the invention.

This system comprises a condensation unit 18 identical or similar to that described in reference to FIG. 1, and an evaporation unit 19 identical or similar to the evaporation unit described in reference in FIG. 2.

The condensation unit 18 and the main evaporation unit 19 are coupled such that the liquid 22 circulates in a closed loop. More precisely, this system comprises:
  a first circuit liquid 13 for injecting liquid 22 recovered at discharge 11 from the condensation unit 18 in the distribution system 14 of the evaporation unit 19; and
  a second circuit liquid 8 for injecting liquid 22 recovered discharging from the evaporation unit 19 in the supply ramp 9 of the condensation unit 18.

In the embodiment of FIG. 3, the first and second liquid circuits 13, 8 each comprise discharge 11, 6 and a pump 12, 7.

The specialist will understand that the flow of the liquid 22 is variable within the system according to the invention, the latter increasing in the condensation unit 18 due to condensation of the condensable gas of the psychrometric mixture, and decreasing in the evaporation unit 19 on contact with the psychrometric mixture 21.

This system advantageously transfers heat between the two gaseous flows while modifying their respective compositions of condensable fluid.

More precisely, the liquid 22:
  cools the psychrometric mixture 20 and impoverishes it of condensable gas in the condensation unit 18; and
  reheats the psychrometric mixture 21 and enriches it with evaporable gas in the evaporation unit 19.

In the system of FIG. 3, when the coolness recovered by the liquid which evaporates in the evaporation unit 19 is sufficient to compensate the heat absorbed by the liquid in the condensation unit 18, the condensation and evaporation pinches can be regulated independently of each other due to regulating of the flows of pumps 7 and 12, each of these pumps being respectively adapted to aspire liquid 22 contained in the compartments 5 and 10 with a variable flow.

Figure 4A:
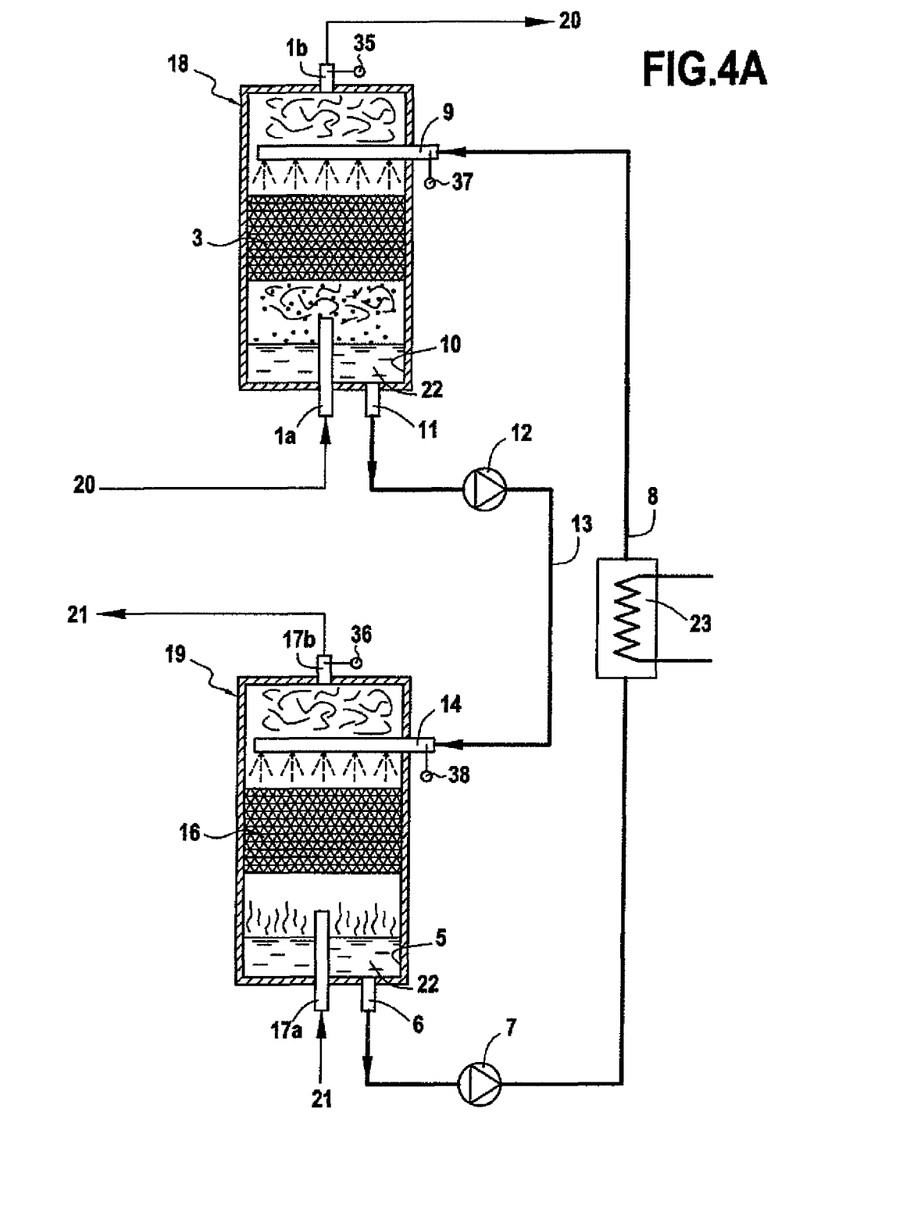
FIGS. 4A and 4B illustrate in their environment optional devices for adjusting the different flows and/or the temperatures in the system of FIG. 3.
Figure 4B:
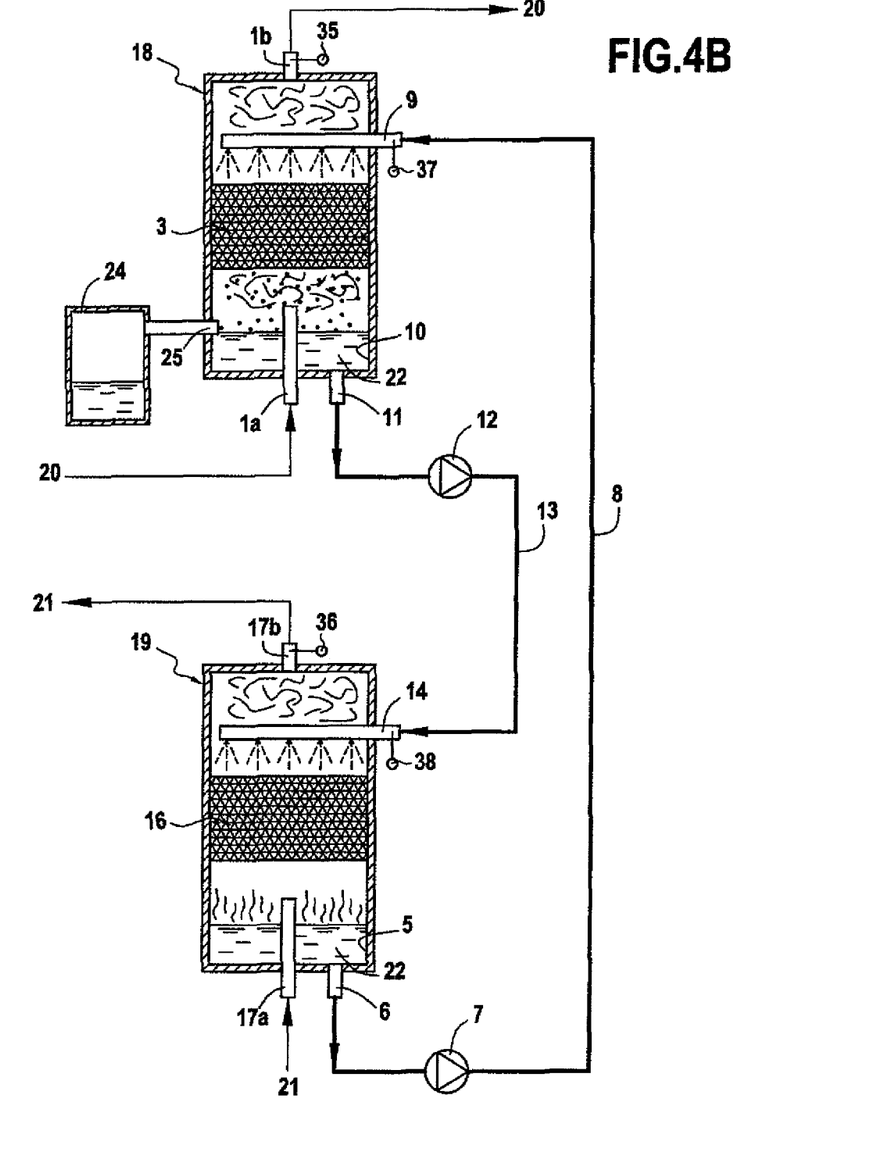

Optional complementary devices (specifically an exchanger 23 and an overflow 24) for adjusting the flow are illustrated in FIGS. 4A and 4B.

In FIG. 4A, an exchanger 23 has been placed on the second circuit liquid 8 for substantially cooling the liquid flow 22 discharging from the evaporation unit 19, prior to reinjection in the condensation unit 18.

Such an exchanger 23 can advantageously be used when the cooling capacities of the liquid flow 22 circulating in the condensation unit 18 are insufficient for balancing both the mass balance between the mass of condensed fluid in this condensation unit 18 and the mass of evaporated fluid in the evaporation unit 19.

In the system of FIG. 4A, the exchanger 23 additionally cools the liquid flow injected into the condensation unit 18, this exchanger justifying when the cooling power recovered in the evaporation unit 19 is less than the heat power to be absorbed in the condensation unit 18.

Such a system is preferably regulated by sequential action on the evaporation and condensation pinches.

For example, initial action is on evaporation pinching by way of the pump 12 whereof the flow is increased. This increase in flow causes a drop in the evaporation pinching and indirectly and normally a decrease in the condensation pinching.

If it eventuates that the condensation pinching does not sufficiently reduce, the start point is increasing the flow of the pump 7.

If the condensation pinching remains too great, action can then be brought in a third attempt on the cooling power of the exchanger 23.

As illustrated in FIG. 4B, an overflow 24 can be introduced to the condensation unit 18, for evacuating, via piping 25, an excess quantity of condensed fluid when the latter is far greater than the quantity of fluid evaporated in the evaporation unit 19.

In the system of FIG. 4B, if the condensation pinching exceeds a threshold representative of a lack of liquid flow injected into the condensation unit, it is preferable to increase the liquid flows injected into the evaporation unit 19 and into the condensation unit 18 in the same proportion to reduce the condensation and evaporation pinches so that:
  the excess of condensed fluid is evacuated via the piping 25; and so that
  the accumulation of liquid phase in the compartment 5 of the evaporation unit 19 is limited.

Another example of executing the invention will now be described in reference to FIG. 5.

In this example, the psychrometric mixture 20 entering the condensation unit 18 is a mixture of humid fumes whereof:
the temperature is 0° C.; and
the water vapour is 4 g of $H_2O$/kg of dry fumes.

In this example; the liquid 22 distributed by the supply ramp 9 is a mixture of water and calcium chloride $CaCl_2$ at −40° C.

As described earlier, the water vapour contained in the humid fumes condenses and is absorbed to reach a concentration of around 0.1 g of $H_2O$/kg of dry fumes.

Figure 5:
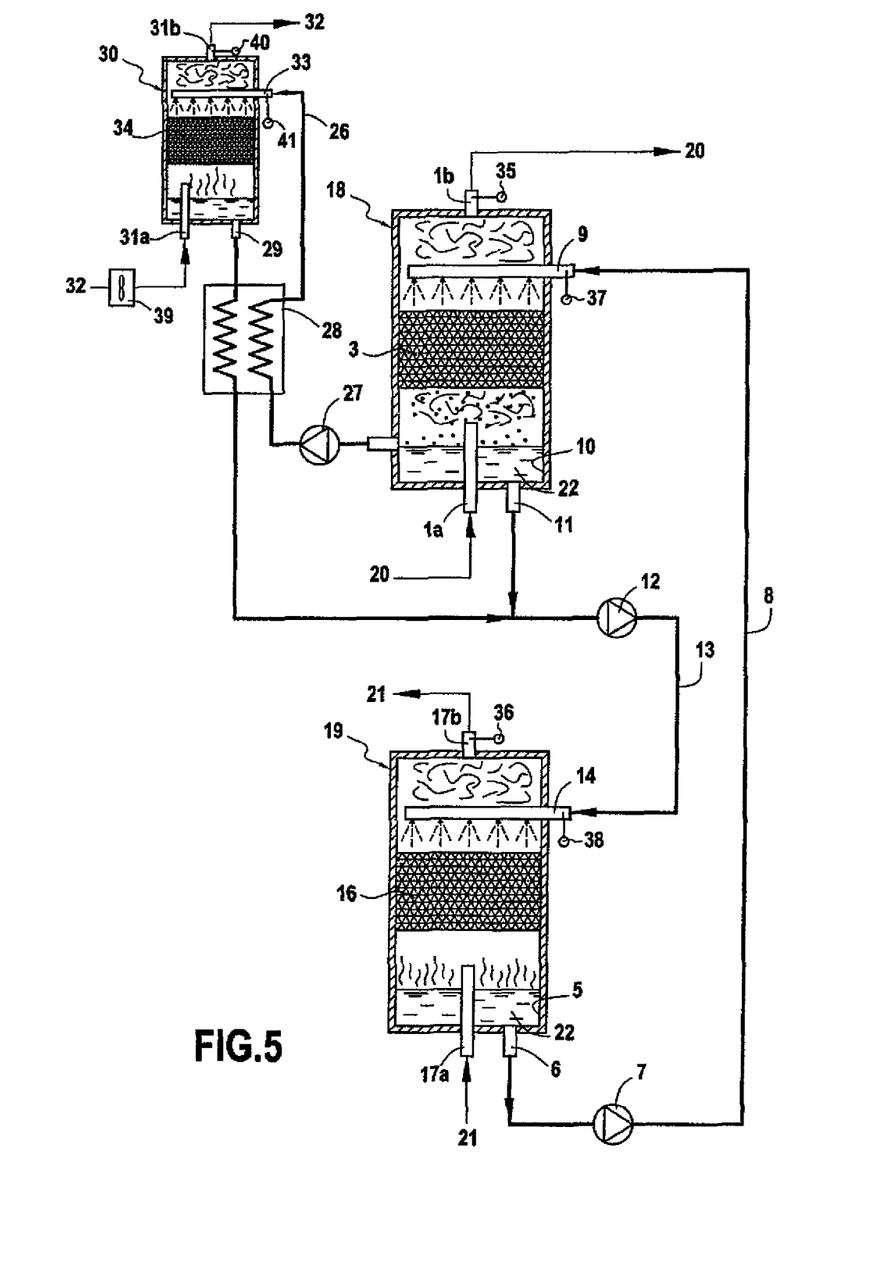
FIGS. 5 and 6 illustrate cooling systems according to the invention in different realisations.

In the example of FIG. 5, a defined flow of the mixture of water and calcium chloride $CaCl_2$, substantially at −40° C., is removed from the compartment 10 of the condensation unit 18 to be reheated by an exchanger 28 to reach a temperature of around +15° C.

When discharged from the exchanger 28, the solution of calcium chloride $CaCl_2$ is conveyed by a circuit 26 then distributed by a distributor 33 over the lining 34 of a secondary evaporation unit referenced 30.

In this example, the evaporation unit 19 is a main evaporation unit in terms of the invention.

In the example described here, the secondary evaporation unit 30 comprises an intake 31a for air 32 at ambient temperature (specifically around 20° C.) and with relative hygrometry far from its saturation conditions, typically of the order of 40%.

The air 32 is circulated by a fan 39 in the secondary evaporation unit 30 counter-current to the solution of calcium chloride $CaCl_2$.

The water contained in excess in the solution of calcium chloride $CaCl_2$ evaporates on contact with unsaturated ambient air 32 on the lining 34, the concentration of this solution increasing at the preferred level of salinity.

The air 32 evacuates from the secondary evaporation unit 30 (via a discharge referenced 31b) at a temperature of around 16° C. and hygrometry of the order of 90%.

The solution of calcium chloride $CaCl_2$ is reheated in the secondary condensation unit 30 on contact with air and is reinjected into the exchanger 28 at a temperature of around 18° C.

It exits therefrom at a temperature of around −38° C. and is then reintegrated into the first circuit liquid 13, where it is mixed with the solution of calcium chloride $CaCl_2$ directly drawn into the compartment 10 of the condensation unit 18.

As described earlier in reference to FIG. 3, the liquid flow 22 downstream of the pump 12 is injected into the distribution system 14 of the main evaporation unit 19.

In this example, the psychrometric mixture 21 which circulates in the main evaporation unit 19 is a mixture of cold fumes, for example at −50° C., far from its condensation conditions.

As described earlier, the solution of recovered calcium chloride $CaCl_2$, discharging from the main evaporation unit 19 is reinjected into the supply ramp 9 of the condensation unit 18.

In this example, the concentration of the solution of calcium chloride $CaCl_2$ discharging from the main evaporation unit 19 is measured by a mechanism known to the specialist and arranged on the connecting piping 6.

Advantageously, the concentration of the solution of calcium chloride $CaCl_2$ discharging from each of the evaporation units 30, 19 can be varied by varying the air flow or cold fumes at the intake of these units, given the temperature and the relative hygrometry of the air and cold fumes.

In the system of FIG. 5 the fan 39 adjusts the air flow which passes through the secondary evaporation unit 30.

In the exemplary embodiment described here, the secondary evaporation unit 30 comprises:
a probe 41 capable of measuring the temperature of the liquid at the intake 33 of this unit; and
a probe 40 capable of measuring the temperature of humid air discharging 31b from this unit.

It is preferable for the spread between the temperatures measured by the probes 40 and 41 (known as "pinching P3") to be of the order of 1 to 2° C.

In a particular embodiment of the invention, when this pinching exceeds 1.5° C., the power of the fan 39 or the water flow entering the secondary evaporation unit is adjusted to ensure that the pinching P3 remains in the preferred range.

In a preferred embodiment, a device (not shown) is used to continuously measure the $CaCl_2$ or LiCl concentration, for example by measuring volumic mass and temperature or by measuring electric resistivity.

When it eventuates that the concentration of water becomes too high, the power of the fan 39 is adjusted to boost evaporation of the water/$CaCl_2$ or water/LiCl mixture to avoid risk of a solid phase forming.

The following overall regulation scheme can be carried out:
if the condensation pinching increases, the liquid flow entering the condensation unit 18 is boosted by the pump 7 to produce targeted pinching (of the order of 1° C.);
if the evaporation pinching increases, the liquid flow is boosted by the pump 12 to produce targeted pinching (of the order of 1° C.);
if the pinching P3 in the secondary evaporation unit 30 increases, the liquid flow entering this unit 30 is boosted by the pump 27; and
if the concentration of water increases, the strength of the fan 39 is increased to decrease the pinching P3.

Figure 6:
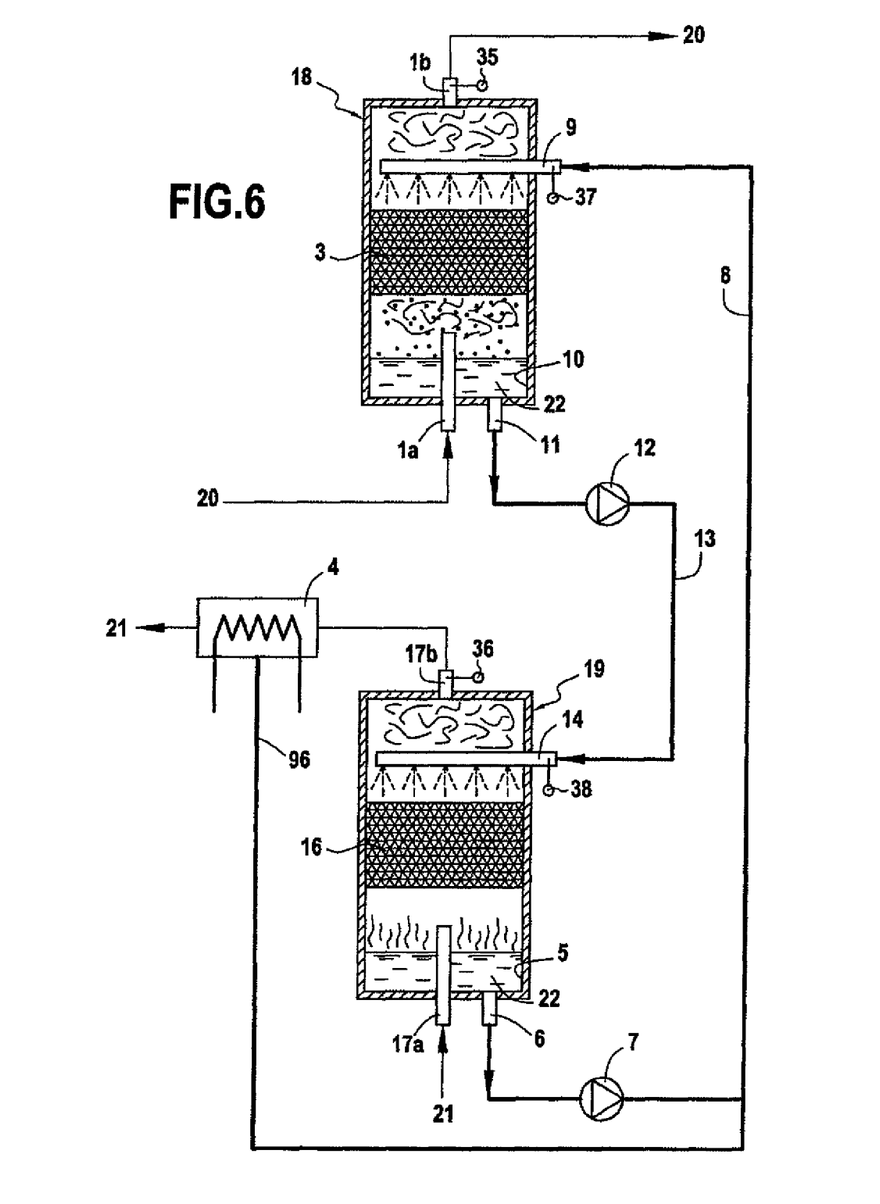

A system according to the invention illustrated in FIG. 6 can also be used to dehumidify a psychrometric mixture of fumes, dehumidification taking place at a temperature of between −40° C. and −90° C., the concentration of water vapour diminishing from $10^{-1}$ to $10^{-6}$ g of $H_2O$/kg of dry fumes.

In this application, the liquid 22 vaporised on the lining 3 of the condensation unit 18 by the supply ramp 9 can be a solution of ethanol or methanol or d-limonene, the water vapour being absorbed by pure ethanol, methanol or d-limonene.

The concentration of ethanol of the mixture of water and ethanol which accumulates in the compartment 10 of the evaporation unit 18 is between 96% and 99.9%; it exceeds the azeotropic concentration of 95% ethanol.

As described earlier, this mixture is distributed over the lining 16 of the main evaporation unit 19.

In this example, the psychrometric mixture 21 constituted by the cold fumes enters the main evaporation unit 19 at around −110° C. and evaporates the water and part of the ethanol.

As described earlier, this psychrometric mixture 21 is evacuated from the evaporation unit 19 via piping 17b.

In the embodiment described here, an exchanger 4 is placed on this piping 17b for recovering and condensing the ethanol contained in these fumes.

The condensed ethanol is reinjected into the second circuit liquid 8 between the discharge of the evaporation unit 19 and the supply ramp 9 of the condensation unit 18 via piping 96.

Figure 7:
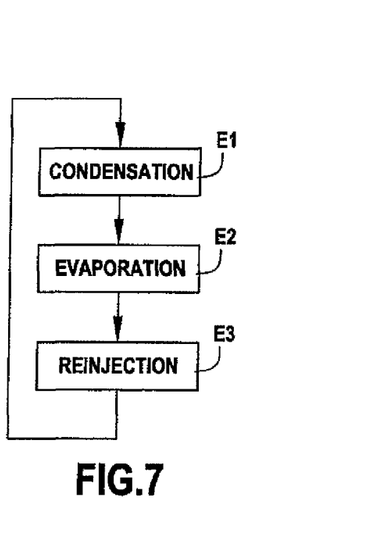
FIG. 7 schematically illustrates the main steps of a cooling process according to the invention.

FIG. 7 schematically illustrates the main steps of a cooling process according to the invention.

This process can be carried out in the system according to the invention for cooling the psychrometric mixture 20. It comprises three main steps carried out in a loop:
- a condensation step E1 of the fluid contained in the psychrometric mixture 20 by direct contact with liquid 22 of a temperature below that of the dew point of the first psychrometric mixture 20;
- an evaporation step E2 of the liquid 22 condensed during the condensation step E1 in a second psychrometric mixture 21 comprising the above cited fluid, the liquid 22 being at a temperature greater than that of the dew point of the second psychrometric mixture 21; and
- a reinjection step E3 of the liquid evaporated during evaporation step E2 for use in the condensation step E1.

The invention claimed is:

1. A cooling system of a first psychrometric mixture, the system comprising:
   a condensation unit comprising a circulation circuit of said first psychrometric mixture, the condensation unit being configured to condense fluid contained in said first psychrometric mixture by direct contact with liquid comprising said fluid, said liquid being in said condensation unit at a temperature below the temperature of a dew point of said first mixture;
   a main evaporation unit comprising a circulation circuit of a second psychrometric mixture comprising said fluid, the main evaporation unit configured to evaporate a liquid in said second psychrometric mixture, said liquid being in said main evaporation unit at a temperature greater than the temperature of a dew point of said second psychrometric mixture, said condensation unit and said main evaporation unit being coupled together via a circulation circuit of said liquid, said circulation circuit of said liquid having a pump and configured to:
      inject said liquid into the condensation unit from the evaporation unit; and
      inject the liquid charged with the condensed fluid into the main evaporation unit from the condensation unit via said pump to move the condensed fluid directly from said pump into said main evaporation unit; and
   a flow regulator configured to regulate at least one flow of said liquid in said system, wherein
   said flow regulator comprises:
      evaporator temperature sensors configured to measure a temperature range between the temperature of the liquid entering said main evaporation unit and the temperature of the psychrometric mixture leaving said main evaporation unit; and
      the pump configured to regulate the liquid flow entering said main evaporation unit as a function of the measured temperature range.

2. The system as claimed in claim 1, wherein the pump is configured to inject liquid into said main evaporation unit from a storage tank.

3. The system as claimed in claim 2, wherein the storage tank used for regulating the liquid flow injected into said main evaporation unit is constituted by a compartment arranged in a lower part of said condensation unit.

4. The system as claimed in claim 1, further comprising an exchanger for cooling said liquid discharging from said main evaporation unit.

5. The system as claimed in claim 4, wherein said flow regulator is configured to:
   increase the liquid flow entering said main evaporation unit;
   increase the liquid flow entering said condensation unit;
   measure the temperature range between the temperature of the liquid entering said condensation unit and the temperature of the psychrometric mixture leaving said condensation unit; and when said temperature range is over a threshold:
   act on said exchanger for said liquid to increase the cooling power.

6. The system as claimed in claim 1, further comprising an overflow for discharging part of the liquid condensed in said condensation unit.

7. The system as claimed in claim 6, wherein said flow regulator is configured to:
   measure the temperature range between the temperature of the liquid entering said condensation unit and the temperature of the psychrometric mixture leaving said condensation unit; and when said temperature range is over a threshold:
   increase liquid flows entering said condensation and main evaporation units in similar proportions.

8. The system as claimed in claim 1, in which said liquid comprises a salt, the system further comprising a secondary evaporation unit of said liquid, placed in series between said condensation unit and said main evaporation unit in said circulation circuit of said liquid, said secondary evaporation unit operating at a temperature much greater than that of said main evaporation unit.

9. The system as claimed in claim 8, wherein said secondary evaporation unit comprises an intake and a discharge for air, the air being capable of circulating counter-current to said liquid in said secondary evaporation unit, and a fan of variable rate upstream of said air intake, said regulating means being capable of adjusting the air flow and the liquid flow entering said secondary evaporation unit as a function of a temperature range between the temperature of liquid entering said unit and the temperature of the air leaving said unit.

10. The system as claimed in claim 8 further comprising a heat exchanger configured to recover the coolness of said liquid flowing from said condensation unit to said secondary evaporation unit.

11. The system as claimed in claim 8, further comprising a mechanism to adjust the salt concentration in said liquid leaving each of said main and secondary evaporation units.

12. A condensation unit comprising a circulation circuit of a psychrometric mixture containing a condensable fluid, a circulation circuit of liquid comprising said fluid, the temperature of said liquid being below that of the dew point of said psychrometric mixture, direct contact means of said psychrometric mixture and of said liquid, and control means capable of measuring a temperature range between the temperature of the liquid entering said unit and the temperature of said psychrometric mixture leaving said unit.

13. The condensation unit as claimed in claim 12, wherein said direct contact means comprise a lining.

14. The condensation unit as claimed in claim 12 wherein said circuits are arranged such that said psychrometric mixture and said liquid circulate counter-current in said unit.

15. An evaporation unit comprising a circulation circuit of a psychrometric mixture containing an evaporable fluid, a circulation circuit of liquid comprising said fluid, the temperature of said liquid being of the order of −40° C. and greater than that of the dew point of said mixture, direct contact means of said psychrometric mixture and of said liquid and control means able to measure a temperature range between the temperature of the liquid entering said unit and the temperature of said psychrometric mixture leaving said unit.

16. A cooling process of a first psychrometric mixture, this process comprising in a closed loop:
   a condensation step of fluid contained in the mixture by direct contact with liquid comprising said fluid, said liquid being at a temperature below that of the dew point of said first mixture, and
   an evaporation step of the liquid condensed during said condensation step in a second psychrometric mixture comprising said fluid, said liquid being at a temperature greater than that of the dew point of said second mixture, and
   a reinjection step for reinjecting liquid evaporated during said evaporation step for use in said condensation step.

17. The system as claimed in claim 1, wherein said flow regulator further comprises:
   condensation temperature sensors configured to measure a temperature range between the temperature of the liquid entering said condensation unit and the temperature of the psychrometric mixture leaving said condensation unit; and
   a second pump configured to regulate the liquid flow entering said condensation unit as a function of the temperature range measured by said condensation temperature sensors.

* * * * *